(12) United States Patent
Mito

(10) Patent No.: US 8,666,972 B2
(45) Date of Patent: Mar. 4, 2014

(54) SYSTEM AND METHOD FOR CONTENT MANAGEMENT AND DETERMINATION OF SEARCH CONDITIONS

(75) Inventor: Tomoko Mito, Kanagawa-ken (JP)

(73) Assignee: International Business Machines Corporation, Armonk, NY (US)

( * ) Notice: Subject to any disclaimer, the term of this patent is extended or adjusted under 35 U.S.C. 154(b) by 777 days.

(21) Appl. No.: 12/370,113

(22) Filed: Feb. 12, 2009

(65) Prior Publication Data

US 2010/0205155 A1    Aug. 12, 2010

(51) Int. Cl.
*G06F 7/00* (2006.01)

(52) U.S. Cl.
USPC ............ 707/722; 707/713; 707/759; 707/689

(58) Field of Classification Search
USPC .................. 707/722, 713, 759, 689
See application file for complete search history.

(56) References Cited

U.S. PATENT DOCUMENTS

| | | | | |
|---|---|---|---|---|
| 6,415,285 | B1 * | 7/2002 | Kitajima et al. | 707/708 |
| 7,831,595 | B2 * | 11/2010 | Suresh et al. | 707/721 |
| 2006/0020576 | A1 * | 1/2006 | Karube | 707/2 |
| 2008/0243791 | A1 * | 10/2008 | Suzuki et al. | 707/3 |
| 2008/0306937 | A1 * | 12/2008 | Whilte et al. | 707/5 |
| 2010/0121859 | A1 * | 5/2010 | Maeda et al. | 707/748 |
| 2010/0179948 | A1 * | 7/2010 | Xie et al. | 707/722 |

FOREIGN PATENT DOCUMENTS

| | | |
|---|---|---|
| JP | 2003337833 | 11/2003 |
| JP | 2004355546 | 12/2004 |
| JP | 2005122322 | 5/2005 |
| JP | 2005258496 | 9/2005 |
| JP | 2006252125 | 9/2006 |
| JP | 2007025756 | 2/2007 |

* cited by examiner

*Primary Examiner* — Pierre Vital
*Assistant Examiner* — Christopher J Raab
(74) *Attorney, Agent, or Firm* — Scully, Scott, Murphy & Presser, P.C.; David L. Adour, Esq.

(57) ABSTRACT

A system, method and article of manufacture for managing, e.g., extracting and displaying, search condition result data, which has been modified since a previous search. Embodiments of the present invention associate search conditions and modification programs with unique identifiers (e.g., a keyword) and log every use of thereof. Thereafter, contextual relationships (e.g., where a search conditions and a modification program are linked to the same unique identifier) between the data modifications and search conditions are identified using search condition and modification program usage logs, and based on the contextual relationships, embodiments of the present invention extracts and displays the result data that has been modified since the search condition was last executed.

19 Claims, 14 Drawing Sheets

FIG. 2a

SEARCH CONDITION 1 (PITCH =1.5) AND (BASIC OVERALL SIZE ≥14) AND (BASIC OVERALL SIZE <60)

| BASIC OVERALL SIZE | PITCH | BASIC OVERALL LENGTH | SCREW LENGTH | SHANK DIAMETER | SHANK SQUARE TAP WIDTH | SHANK SQUARE TAP LENGTH | BASIC EFFECTIVE DIAMETER | TOP EFFECTIVE DIAMETER TOLERANCE | BOTTOM EFFECTIVE DIAMETER TOLERANCE | EFFECTIVE DIAMETER TOLERANCE | CORE DIAMETER |
|---|---|---|---|---|---|---|---|---|---|---|---|
| 14.000 | 1.5 | 95 | 30 | 11.2 | 9 | 12 | 13.026 | 45 | 15 | 30 | 12.376 |
| 15.000 | 1.5 | 95 | 30 | 11.2 | 9 | 12 | 14.026 | 45 | 15 | 30 | 13.376 |
| 16.000 | 1.5 | 102 | 32 | 12.5 | 10 | 13 | 15.026 | 45 | 15 | 30 | 14.376 |
| 17.000 | 1.5 | 102 | 32 | 12.5 | 10 | 13 | 16.026 | 45 | 15 | 30 | 15.376 |
| 18.000 | 1.5 | 112 | 37 | 14 | 11.2 | 14 | 17.026 | 45 | 15 | 30 | 16.376 |
| 20.000 | 1.5 | 112 | 37 | 14 | 11.2 | 14 | 19.026 | 45 | 15 | 30 | 18.376 |
| 22.000 | 1.5 | 118 | 38 | 16 | 12.5 | 16 | 21.026 | 45 | 15 | 30 | 20.376 |
| 24.000 | 1.5 | 130 | 45 | 18 | 14 | 18 | 23.026 | 48 | 16 | 32 | 22.376 |
| 25.000 | 1.5 | 130 | 45 | 18 | 14 | 18 | 24.026 | 48 | 16 | 32 | 23.376 |
| 27.000 | 1.5 | 127 | 37 | 20 | 16 | 20 | 26.026 | 48 | 16 | 32 | 25.376 |
| 28.000 | 1.5 | 127 | 37 | 20 | 16 | 20 | 27.026 | 48 | 16 | 32 | 26.376 |
| 30.000 | 1.5 | 127 | 37 | 20 | 16 | 20 | 29.026 | 48 | 16 | 32 | 28.376 |
| 32.000 | 1.5 | 137 | 37 | 22.4 | 18 | 22 | 31.026 | 48 | 16 | 32 | 30.376 |
| 33.000 | 1.5 | 137 | 37 | 22.4 | 18 | 22 | 32.026 | 48 | 16 | 32 | 31.376 |
| 35.000 | 1.5 | 144 | 39 | 25 | 20 | 24 | 34.026 | 48 | 16 | 32 | 33.376 |
| 36.000 | 1.5 | 144 | 39 | 25 | 20 | 24 | 35.026 | 48 | 16 | 32 | 34.376 |
| 39.000 | 1.5 | 149 | 39 | 28 | 22.4 | 26 | 38.026 | 48 | 16 | 32 | 37.376 |
| 40.000 | 1.5 | 149 | 39 | 28 | 22.4 | 26 | 39.026 | 48 | 16 | 32 | 38.376 |
| 42.000 | 1.5 | 149 | 39 | 28 | 22.4 | 26 | 41.026 | 48 | 16 | 32 | 40.376 |
| 45.000 | 1.5 | 165 | 45 | 31.5 | 25 | 28 | 44.026 | 48 | 16 | 32 | 43.376 |
| 48.000 | 1.5 | 165 | 45 | 31.5 | 25 | 28 | 47.026 | 51 | 17 | 34 | 46.376 |
| 50.000 | 1.5 | 165 | 45 | 31.5 | 25 | 28 | 49.026 | 51 | 17 | 34 | 48.376 |
| 52.000 | 1.5 | 175 | 45 | 35.5 | 28 | 31 | 51.026 | 51 | 17 | 34 | 50.376 |
| 55.000 | 1.5 | 175 | 45 | 35.5 | 28 | 31 | 54.026 | 51 | 17 | 34 | 53.376 |
| 56.000 | 1.5 | 175 | 45 | 35.5 | 28 | 31 | 55.026 | 51 | 17 | 34 | 54.376 |

230 SEARCH CONDITION [2] (PITCH =2) AND (BASIC OVERALL SIZE ≥18) AND (BASIC OVERALL SIZE < 60)

| BASIC OVERALL SIZE | PITCH | BASIC OVERALL LENGTH | SCREW LENGTH | SHANK DIAMETER | SHANK SQUARE TAP WIDTH | SHANK SQUARE TAP LENGTH | BASIC EFFECTIVE DIAMETER | TOP EFFECTIVE DIAMETER TOLERANCE | BOTTOM EFFECTIVE DIAMETER TOLERANCE | EFFECTIVE DIAMETER TOLERANCE | CORE DIAMETER |
|---|---|---|---|---|---|---|---|---|---|---|---|
| 18.000 | 2 | 112 | 37 | 14 | 11.2 | 14 | 16.701 | 51 | 17 | 34 | 15.835 |
| 20.000 | 2 | 112 | 37 | 14 | 11.2 | 14 | 18.701 | 51 | 17 | 34 | 17.835 |
| 22.000 | 2 | 118 | 38 | 16 | 12.5 | 16 | 20.701 | 51 | 17 | 34 | 19.835 |
| 24.000 | 2 | 130 | 45 | 18 | 14 | 18 | 22.701 | 54 | 18 | 36 | 21.835 |
| 25.000 | 2 | 130 | 45 | 18 | 14 | 18 | 23.701 | 54 | 18 | 36 | 22.835 |
| 27.000 | 2 | 127 | 37 | 20 | 16 | 20 | 25.701 | 54 | 18 | 36 | 24.835 |
| 28.000 | 2 | 127 | 37 | 20 | 16 | 20 | 26.701 | 54 | 18 | 36 | 25.835 |
| 30.000 | 2 | 127 | 37 | 20 | 16 | 20 | 28.701 | 54 | 18 | 36 | 27.835 |
| 32.000 | 2 | 137 | 37 | 22.4 | 18 | 22 | 30.701 | 54 | 18 | 36 | 29.835 |
| 33.000 | 2 | 137 | 37 | 22.4 | 18 | 22 | 31.701 | 54 | 18 | 36 | 30.835 |
| 35.000 | 2 | 144 | 39 | 25 | 20 | 24 | 31.701 | 54 | 18 | 36 | 32.835 |
| 36.000 | 2 | 144 | 39 | 25 | 20 | 24 | 34.701 | 54 | 18 | 36 | 33.835 |
| 39.000 | 2 | 149 | 39 | 28 | 22.4 | 26 | 37.701 | 54 | 18 | 36 | 36.835 |
| 40.000 | 2 | 149 | 39 | 28 | 22.4 | 26 | 38.701 | 54 | 18 | 36 | 37.835 |
| 42.000 | 2 | 149 | 39 | 28 | 22.4 | 26 | 40.701 | 54 | 18 | 36 | 39.835 |
| 45.000 | 2 | 165 | 45 | 31.5 | 25 | 28 | 43.701 | 54 | 18 | 36 | 42.835 |
| 48.000 | 2 | 165 | 45 | 31.5 | 25 | 28 | 46.701 | 57 | 19 | 38 | 45.835 |
| 50.000 | 2 | 165 | 45 | 31.5 | 25 | 28 | 48.701 | 57 | 19 | 38 | 47.835 |
| 52.000 | 2 | 175 | 45 | 35.5 | 28 | 31 | 50.701 | 57 | 19 | 38 | 49.835 |
| 55.000 | 2 | 175 | 45 | 35.5 | 28 | 31 | 53.701 | 57 | 19 | 38 | 52.835 |
| 56.000 | 2 | 175 | 45 | 35.5 | 28 | 31 | 54.701 | 57 | 19 | 38 | 53.835 |

FIG. 2b

SEARCH CONDITION | Pitch = 1.5 && Basic Overall Size ≥ 14 && Basic Overall Size < 60
430b Search Result: 430c

| BASIC OVERALL SIZE | PITCH | BASIC OVERALL LENGTH | SCREW LENGTH | SHANK DIAMETER | ... |
|---|---|---|---|---|---|
| 14.000 | 1.5 | 95 | 30 | 11.2 | |
| 15.000 | 1.5 | 95 | 30 | 11.2 | |
| 16.000 | 1.5 | 102 | 32 | 12.5 | |
| 17.000 | 1.5 | 102 | 32 | 12.5 | |
| 18.000 | 1.5 | 112 | 37 | 14 | |
| 20.000 | 1.5 | 112 | 37 | 14 | |
| | | | | | |
| | | | | | |
| | | | | | |

430a — Add New Keyword to the search condition [X]

Keyword: _____  Issue No. _____

Value: _____  27

☐ Add to search condition

[OK] [CANCEL]

FIG. 4b

SEARCH CONDITION 440b — Pitch = 2 && Basic Overall Size ≥ 18 && Basic Overall Size < 60

Search Result: 440c

| BASIC OVERALL SIZE | PITCH | BASIC OVERALL LENGTH | SCREW LENGTH | SHANK DIAMETER | ... |
|---|---|---|---|---|---|
| 18.000 | 2 | 112 | 37 | 14 | |
| 20.000 | 2 | 112 | 37 | 14 | |
| 22.000 | 2 | 118 | 38 | 16 | |
| 24.000 | 2 | 130 | 45 | 18 | |
| 25.000 | 2 | 130 | 45 | 18 | |
| 27.000 | 2 | 127 | 37 | 20 | |
| | | | | | |

440a — Add Registered Keyword to the search condition  [X]

| Keyword | Value |
|---|---|
| Issue No. | 27 |
| Due date | 2007/xx/xx |

[OK] [CANCEL]

FIG. 4c

SYSTEM AND METHOD FOR CONTENT MANAGEMENT AND DETERMINATION OF SEARCH CONDITIONS

FIELD OF THE INVENTION

The present application pertains generally to databases and search conditions, which produce result sets that are stored and performed thereon, and specifically to dynamically tracking modifications occurring to the result sets of the search conditions.

BACKGROUND OF THE INVENTION

Storage of data within data repositories has become increasingly more important and complex as the amount of data stored therein has increased. Data repositories include databases and any other data storage and memory architecture used to maintain, store and access data. Thus, for example, databases using computers have now become widespread. Large-scale databases often include an enormous amount of data, which needs to be maintained and searched. In addition, databases and similar technologies have become common place on the global Internet. Internet search engines are one example, in regular use, that perform similar functions to a database—namely, data searching and maintenance; e.g., updating the content links, content repositories and the popularity of a web page, etc. (see generally Berry et al. *Understanding Search Engines: Mathematical Modeling and Text Retrieval,* SIAM (2005)). Since modern databases, and similar technologies, store ever increasing amounts of data, searching through the large repositories of data must be carried out efficiently. In view of this, a number of different kinds of search systems have evolved.

For example, a typical database employs data records in a relational database management system (RDBMS) in a computing device. The data records are maintained in tables by the RDBMS, where the tables are a collection of rows all having the same columns. Each column maintains information on a particular type of data for the data records that comprise the rows. Database tables may be accessed using a specialized language, e.g., standard languages similar to the Structured Query Language (SQL) commands or proprietary languages similar to the keywords used in search engines, which typically include instructions to query, access, and manipulate data in a database. Thus, for example, the SQl language comprises set operators that define operations to be performed when searching columns of database tables. For instance, a SQL set operator may look for all records having a field that satisfies a certain search condition, such as equal to, less than, etc. to a certain value.

In addition, when a search is executed by entering search conditions (e.g., specifying a search condition by using the SQL language) and search results are acquired, the search needs to be executed again if the search result data is modified (e.g., data has been added, deleted or updated) after the original search. Consequently, storage and management of search conditions and determination of the modification status for the search result data (or simply "search results") are handled manually. For example, a user may simply execute the search condition again and compare the search results to determine if the results have changed because a modification program was previously executed. To facilitate execution, search conditions are typically stored so that they can be recalled easily. In addition, search conditions are often shared among users (e.g., allowing each user to execute the search condition) to accommodate multiple users requiring access to search results.

Current technologies, however, which store and index large repositories of data (e.g., database systems and Internet search engines) do not allow users to display search conditions that have undergone modifications to the corresponding search results since a previous execution of the search conditions without executing the search condition again and thereby increase the computational and storage requirements necessary to maintain the data repository. In other words, it is not possible to recognize the status of data modifications (e.g., whether the search results have changed since the previous execution of the search condition) without re-executing the search condition, which creates a large workload.

SUMMARY OF THE INVENTION

The present invention is directed to embodiments that provide database storage and access methods, systems and articles of manufacture, which extract search conditions for search results that may be affected by changes to the search result data. In one embodiment of present invention, the search conditions are stored and associated with keywords. The keywords can be registered by a user. In addition, the keywords are registered to a modification domain, comprising a data set (possibly stored in tables, but not necessarily) that will be modified by a modification program. In addition, the keywords are unique to the modification domain. Consequently, by using an identical keyword on multiple search conditions for a specific modification domain, every search condition using that keyword will be linked to each other within a specified modification domain. A modification program includes operations performed on the data repository which modifies data in some manner. Examples of a modification program include SQL commands that insert new data or delete/update existing data in the database or the execution of web spiders that update the data repository used by a search engine. Modification programs may also be assigned keywords. Consequently, by using an identical keyword on multiple modification programs for a specific modification domain, every modification program using that keyword will be linked to each other within the specified modification domain.

In addition, when a search condition is used for searching or when data is modified within the modification domain by a modification program, one embodiment of the present invention store logs, which include execution information—e.g., the execution date. Upon being directed by a user, the logs are searched for contextual relationships (e.g., where a search conditions and a modification program are linked to the same keyword in the same modification domain) between records, or entries, stored in the logs. Based on the found contextual relationships between the data modification and search execution, the search results that have been modified since a previous execution of the search conditions are extracted and displayed to the user.

Therefore, one aspect of the present invention provides a computer-implemented method of managing search conditions used for searching database content to produce a result set, comprising:

storing a search condition with a first identifier, where the search condition has been associated with the first identifier;

storing a modification program with a second identifier, where the modification program has been associated with the second identifier and said modification program modifying the result set of the search condition;

associating the first identifier with the second identifier with a keyword;

logging execution of the search condition into a first log, where the first log is indexed by a first date in a search log;

logging execution of the modification program into a second log, where the second log is indexed by a second date in a modification log;

searching the first log and the second log by comparing the first date and the second date according to the keyword associated with the first and second identifier;

extracting outdated search conditions for results that have been modified after the outdated search conditions were executed.

Another aspect of the present invention provides a system of managing search conditions pertaining to accessing database content to produce a result set, comprising:

means for storing a search condition with a first identifier, where the search condition has been associated with the first identifier;

means for storing a modification program with a second identifier, where the modification program has been associated with the second identifier and said modification program modifying the result set of the search condition;

means for associating the first identifier with the second identifier with a keyword;

means for logging execution of the search condition into a first log, where the first log is indexed by a first date in a search log;

means for logging execution of the modification program into a second log, where the second log is indexed by a second date in a modification log;

means for searching the first log and the second log by comparing the first date and the second date according to the keyword associated with the first and second identifier;

means for extracting outdated search conditions for results that have been modified after the search conditions were executed.

Yet another aspect of the present invention provides A computer-readable medium embodying a listing of instructions executed by a computing device to implement a method of managing search conditions pertaining to accessing database content to produce a result set on said computing device, said method comprising:

storing a search condition with a first identifier, where the search condition has been associated with the first identifier;

storing a modification program with a second identifier, where the modification program has been associated with the second identifier and said modification program modifying the result set of the search condition;

associating the first identifier with the second identifier with a keyword;

logging execution of the search condition into a first log, where the first log is indexed by a first date in a search log;

logging execution of the modification program into a second log, where the second log is indexed by a second date in a modification log;

searching the first log and the second log by comparing the first date and the second date according to the keyword associated with the first and second identifier;

extracting outdated search conditions for results that have been modified after the outdated search conditions were executed.

BRIEF DESCRIPTION OF THE DRAWINGS

The novel features of the invention are set forth in the appended claims. The invention itself however, as well as a preferred mode of use, further objects and advantages thereof, will best be understood by reference to the following detailed descriptions of illustrative embodiments when read in conjunction with the accompanying drawings, wherein:

FIG. 2a illustrates an example search condition and search result data, according to one embodiment of the present invention.

FIG. 2b illustrates another example search condition and search result data, according to one embodiment of the present invention.

FIG. 4b is a user interface allowing a user to add a new keyword/value pair to a search condition, according to one embodiment of the present invention.

FIG. 4c is a user interface allowing a user to add an existing keyword/value pair, according to one embodiment of the present invention.

DETAILED DESCRIPTION OF THE INVENTION

FIGS. 1a-1e are flowcharts illustrating a database search condition management process 100, which is used to maintain search conditions, according to one embodiment of the present invention. In the embodiment shown in FIG. 1a, a user first registers and stores any number of search conditions (in step 103) and keywords (at step 106), as described below. In addition, the user assigns a value to each registered keyword and registers the keyword/value pairs in step 109 and links registered search conditions with registered keyword/value pairs in step 112.

Figure 1B:
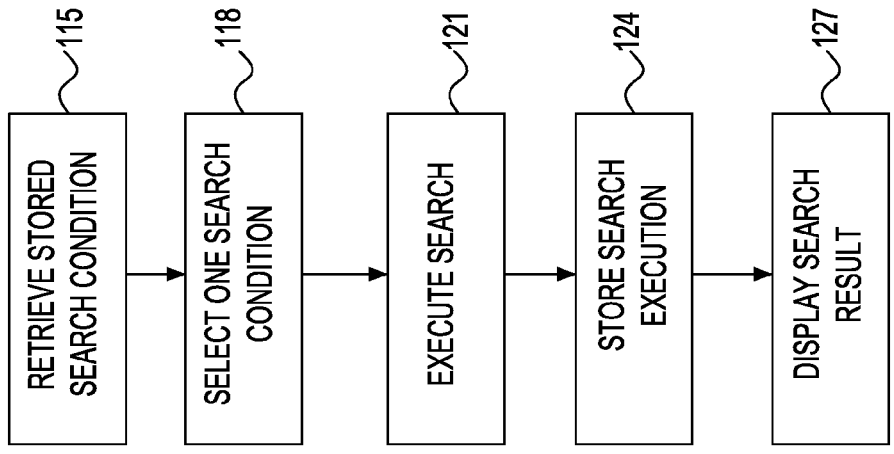
FIGS. 1a-1e illustrates the database search condition management process, according to one embodiment of the present invention.

In FIG. 1b, after the registration of search conditions and keyword/value pairs in steps 103-112, a user (who may not be the same user which registered the search conditions and keyword/value pairs) retrieves previously stored search conditions in step 115 and selects a search condition (at step 118) to execute (at step 121). For each search condition executed, a log of the search execution is stored in step 124, in a process described below, and the search results are displayed to the user in step 127.

Figure 1A:
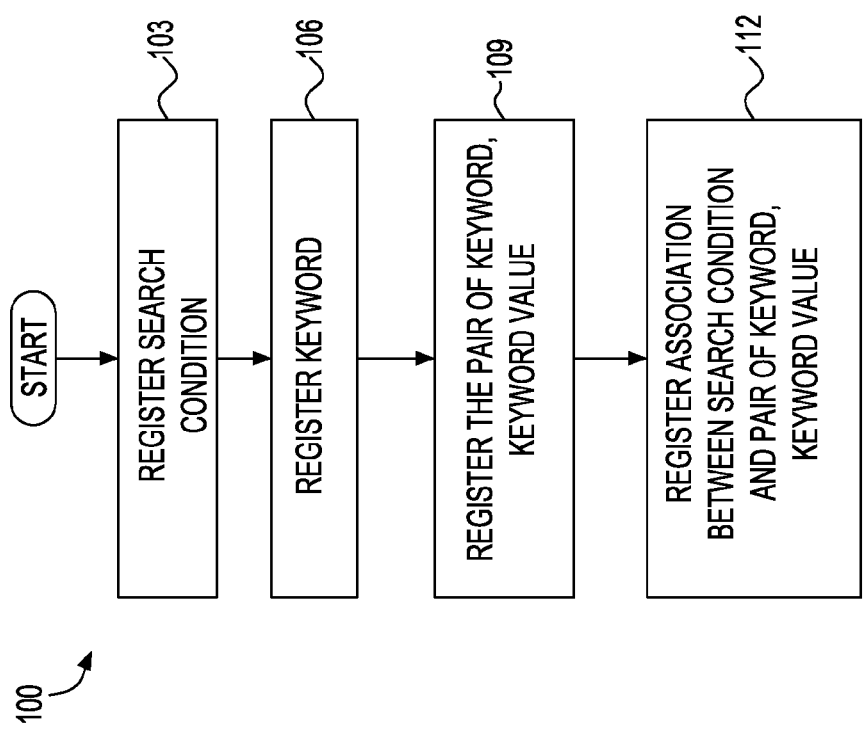
Figure 1E:
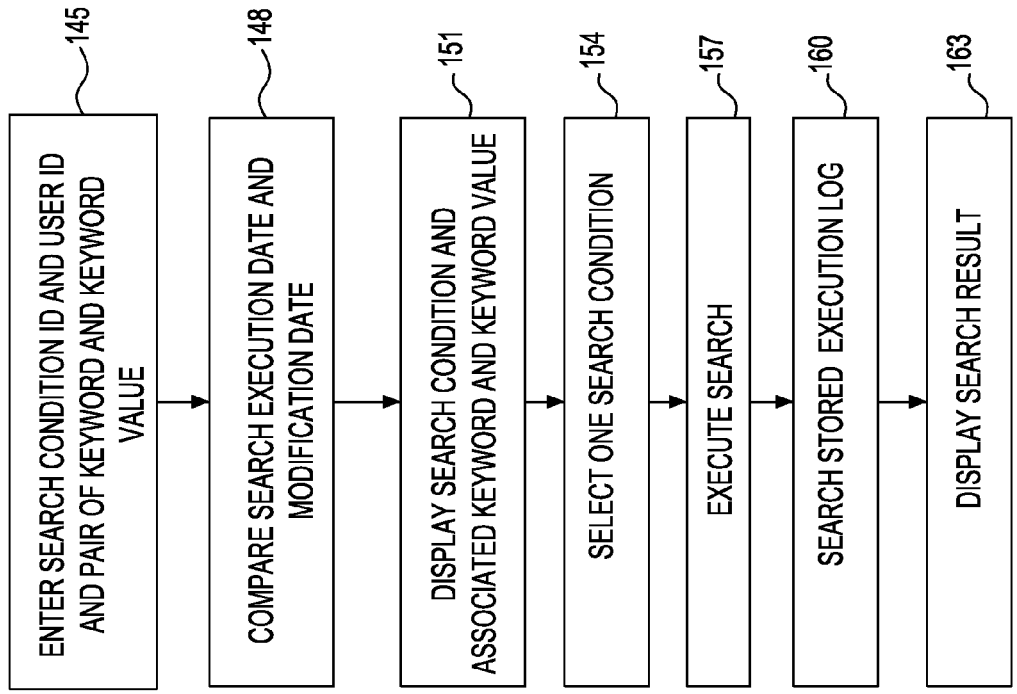
Figure 1C:
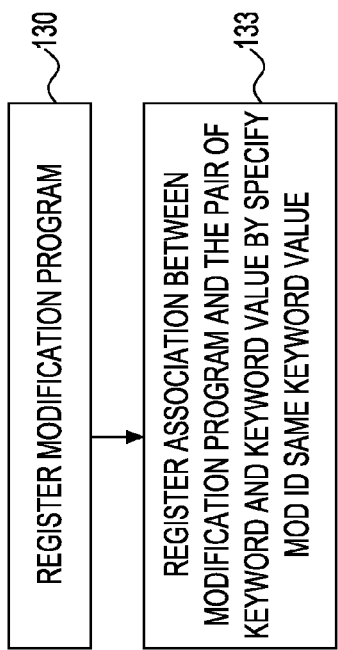

FIG. 1*c* shows in process 100, a user also registers modification programs (as defined herein, a modification program includes any executable, computer-implemented code that modifies data stored in the data repository) in step 130 and links the modification program and keyword/value pairs (as registered in step 109) in step 133. The link between the modification program and the keyword/value pair is stored according to a modification program ID within a modification table, according to the embodiment shown in FIG. 1*c*. Those skilled in the art, however, would recognize that other means of linking modification programs and keyword/value pairs are easily achieved and without undue experimentation.

While the embodiment illustrated in FIGS. 1*a* and 1*c* indicates that the registration of search conditions and their associated keyword/value pairs (in FIG. 1*a*, at steps 103 and 112) occurs before the registrations of modification programs and their associated keyword/value pairs (in FIG. 1*c*, at steps 130 and 133), alternative embodiments are possible. For example, registrations of modification programs and their associated keyword/value pairs could happen before the registration of search conditions and their associated keyword/value pairs or the registrations could be intermingled. Furthermore, while steps 106 and 109 in FIG. 1*a* indicate that registration of a keyword and its assigned value are separable from the registration of a search condition, another embodiment of the present invention would combine the registration of search conditions and/or modification programs with the registration of keywords and their respective values into a single step. Therefore, the registration order of keywords and their respective values, search conditions and modification programs shown in process 100 is merely exemplary and not a limitation on the present inventions. Those skilled in the art would recognize that other registration orders are easily achieved and without undue experimentation.

Figure 1D:
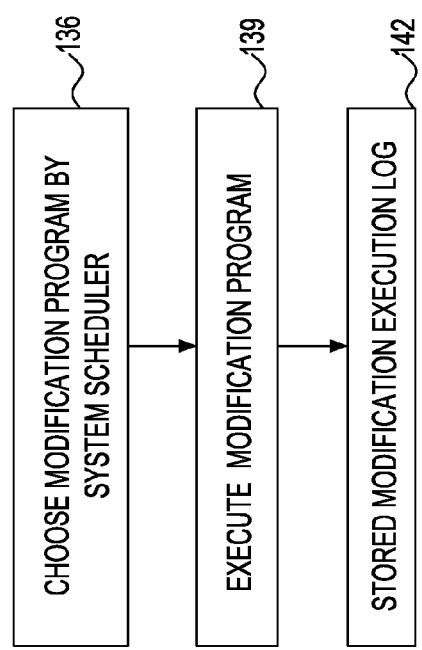

In FIG. 1*d*, at step 136, a modification program is chosen for execution by a system scheduler (include, for example, a program scheduler operated by the RDBMS or underlying operating system) and executed in 139 and a modification log entry is added in step 142. Although the embodiment shown in FIG. 1*d* indicates a modification program is chosen for execution by a system scheduler in step 136 (e.g., as part of a scheduled maintenance and update program for the data repository used by a search engine), those skilled in the art would recognize that other means of executing a modification program are easily achieved and without undue experimentation (e.g., executing a modification program at the direction of a user).

According to the embodiment of process 100 shown in FIG. 1*e*, a user enters a search condition, user ID and keyword/value pair in step 145 (as described below). Based on the search condition and keyword/value pair entered in step 145, process 100 compares the last search execution date and modification program date in the respective logs at step 148 and displays, in step 151, only the search conditions and keyword/value pairs where the last modification program date occurred later than the last search condition date.

From the display of search conditions shown in step 151, the user selects a search condition to execute in step 154, the search condition is executed in step 157 and the search condition log is updated in step 160. Finally, the new search results are displayed for the user in step 163.

FIG. 2*a* illustrates an example search condition and sample search result data when executing the search condition on a sample database. Specifically, search condition 210 has a search condition ID 210*a* value of "1". The Search Condition ID is associated with search logic (e.g., keywords/attributes) 210*b* (as described below), where search logic 210*b* equals "(Pitch=1.5) AND (Basic Overall Size≥14) AND (Basic Overall Size<60)" in the example shown in FIG. 2*a* relating to a search query for a screw device. In one embodiment of the present invention, Search Condition ID 210*a* is automatically assigned to a search condition entered by a user. Thus, when a user inputs a search condition to extract desired data from the database (using, for example, the user interface described below), the search condition is assigned Search Condition ID. Finally, FIG. 2*a* illustrates an example search results table 220 that results from executing search logic 210*b* on a table in a database.

FIG. 2*b* illustrates another example search condition and sample search result data when executing the search condition on a sample database. Specifically, search condition 230 has a Search Condition ID 230*a* value of "2". The Search Condition ID is associated with search logic 230*b*, where search logic 230*b* equals "(Pitch=2) AND (Basic Overall Size≥18) AND (Basic Overall Size<60)" in the example shown in FIG. 2*b* also relating to a search query for a screw device. In one embodiment of the present invention, search condition ID 230*a* is automatically assigned to a search condition entered by a user. Thus, when a user inputs a search condition to extract desired data from the database (using, for example, the user interface described below), the search condition is assigned Search Condition ID. Finally, FIG. 2*b* illustrates an example search results table 240 that results from executing search logic 230*b* on a table in a database.

Figure 3A:
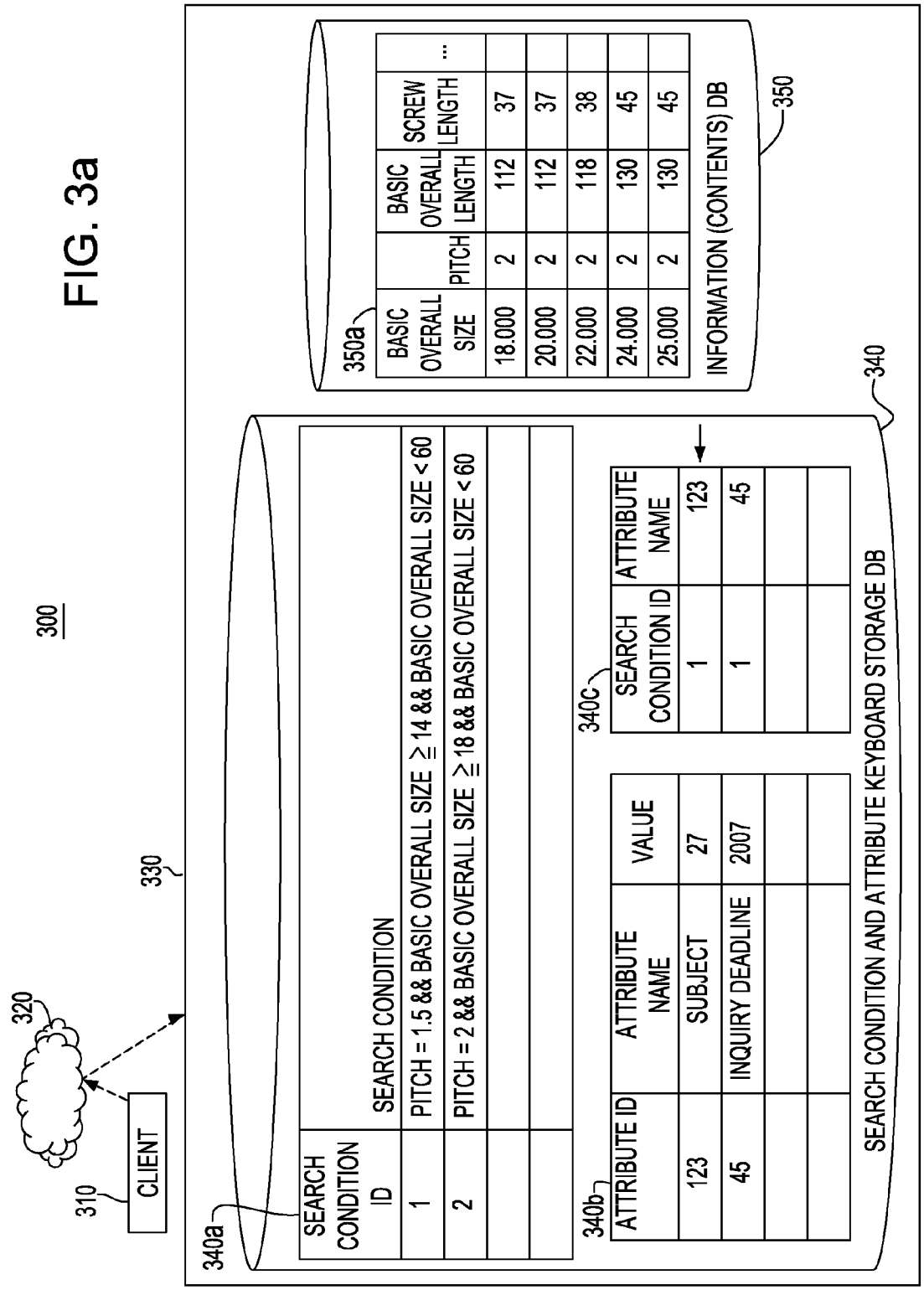
FIG. 3a is a schematic diagram illustrating one embodiment of a data storage repository in accordance with the present invention.

FIG. 3*a* is a schematic diagram illustrating a system for implementing the process of FIGS. 1*a*-1*e*, according to one embodiment of the present invention. As shown in FIG. 3*a*, client 310 (a computing device, as described below) communicates with server 330 (also a computing device) over communications network 320. Communications network 320 may include any network allowing two or more computing devices to communicate with each other. Example communications networks include, but are not limited to, the global Internet, corporate intranets, Ethernet, and other forms of Local Area Networks and Wide Area Networks. The medium of communication between the computing devices in Communications Network 320 may take various forms that include, but are not limited to, wired communications, wireless communications and satellite communications. In addition, communications network 320 may allow other forms of communication in conjunction with data communications—for example, communications network 320 may include voice communications.

In one embodiment of the present invention, server 330 stores two separate databases: Search Condition and Attribute/Keyword DB 340 and Information DB 350. As illustrated in FIG. 3*a*, Search Condition and Attribute/Keyword DB 340 stores the search conditions (for example, search condition 210 shown in FIG. 2*a*), keyword and attribute information. For example, in table 340*a*, search conditions are stored (including search condition ID and search text). In table 340*b*, keywords and their respective values are stored. As shown in table 340*b*, keyword "123" has a value "27" assigned to it and keyword "45" has the value "2007" assigned to it. In addition, while not shown in FIG. 3*a*, keywords may have an accompanying description, where the description further defines the function of the keyword and how the value assigned to the keyword is used. For example a keyword description could include: Keyword, Table Name, Modification Domain, Item Compared with Search Date and Item Compare with Search Time. The keyword description may also be stored in a table, within Search Condition and Attribute/Keyword DB 340, according to one embodiment of the present invention. Furthermore, keywords may be shared between more than one client 310. When more than one client is able to share a keyword, one embodiment of the present invention identifies the different users using a keyword by storing the User ID of each user in the Search Condition and Attribute/Keyword DB 340.

Also shown in Search Condition and Attribute/Keyword DB 340 is table 340c, which associates the search condition ID (from table 340a) to keywords in table 340b. Moreover, as shown in table 340c, more than one keyword may be associated with a single search condition ID and, while not shown in FIG. 3a, more than one search condition ID may be associated with a single keyword. Finally, in Information DB 350, tables containing data to be searched by the search conditions in table 340a are stored—for example table 350a.

Figure 3B:
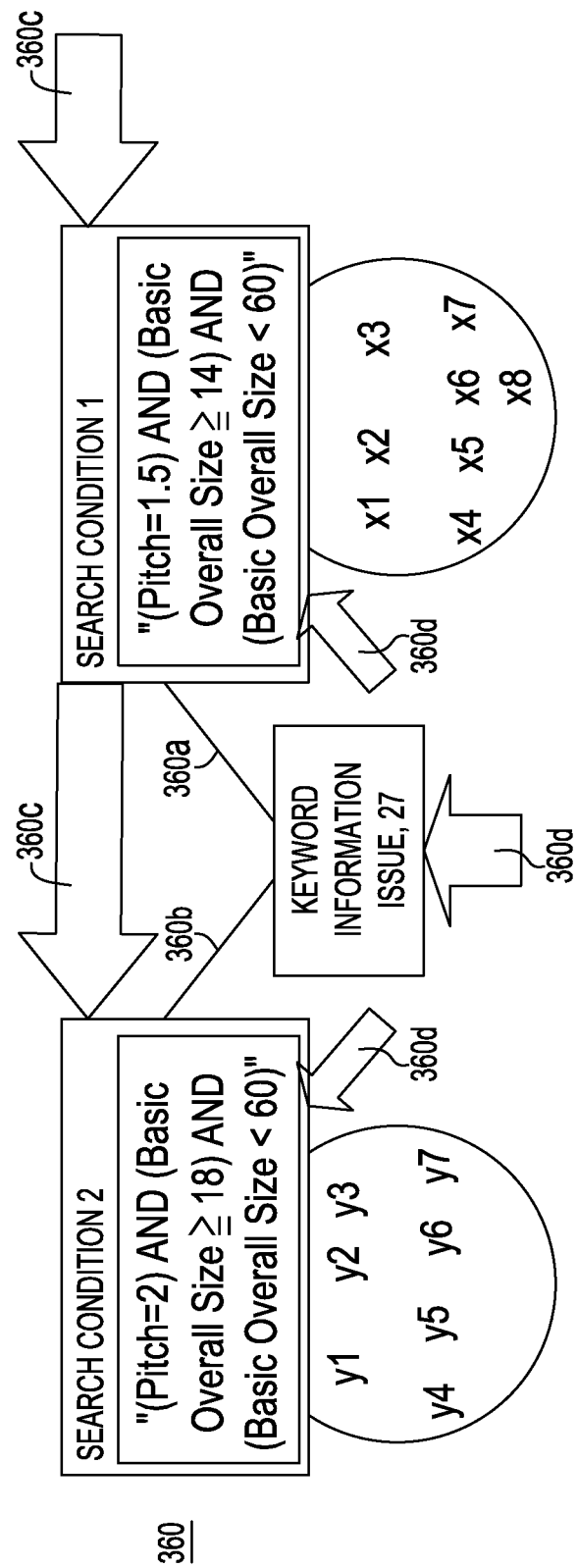
FIG. 3b is a schematic diagram illustrating another embodiment of the present invention.

FIG. 3b is a schematic diagram illustrating a workflow according to one embodiment of the present invention. In FIG. 3b, workflow 360 may operated in conjunction with the system illustrated in FIG. 3a and the workflow illustrated in FIG. 3c. Workflow 360 thus illustrates a computer-implemented process, where each step is automatically performed. In addition, workflow 360 also illustrates a computer-implemented process that may include manual entry by a user. In step 360a of workflow 360, keyword information is added to a search condition (e.g., search condition 1, as illustrated in FIG. 2a, which produces data points x1-x8 in a search result). In step 360b, keyword information is added to another search condition (e.g., search condition 2, as illustrated in FIG. 2b, which produces data points y1-y7 in a search result). In step 360c, when one search condition is executed, other search conditions that shared the same keyword may optionally be executed and the search results are displayed along with the executed search conditions results. Finally, in step 360d, a user may optionally enter the keyword and display all the search conditions associated with the keyword (as described in further detail below).

Figure 3C:
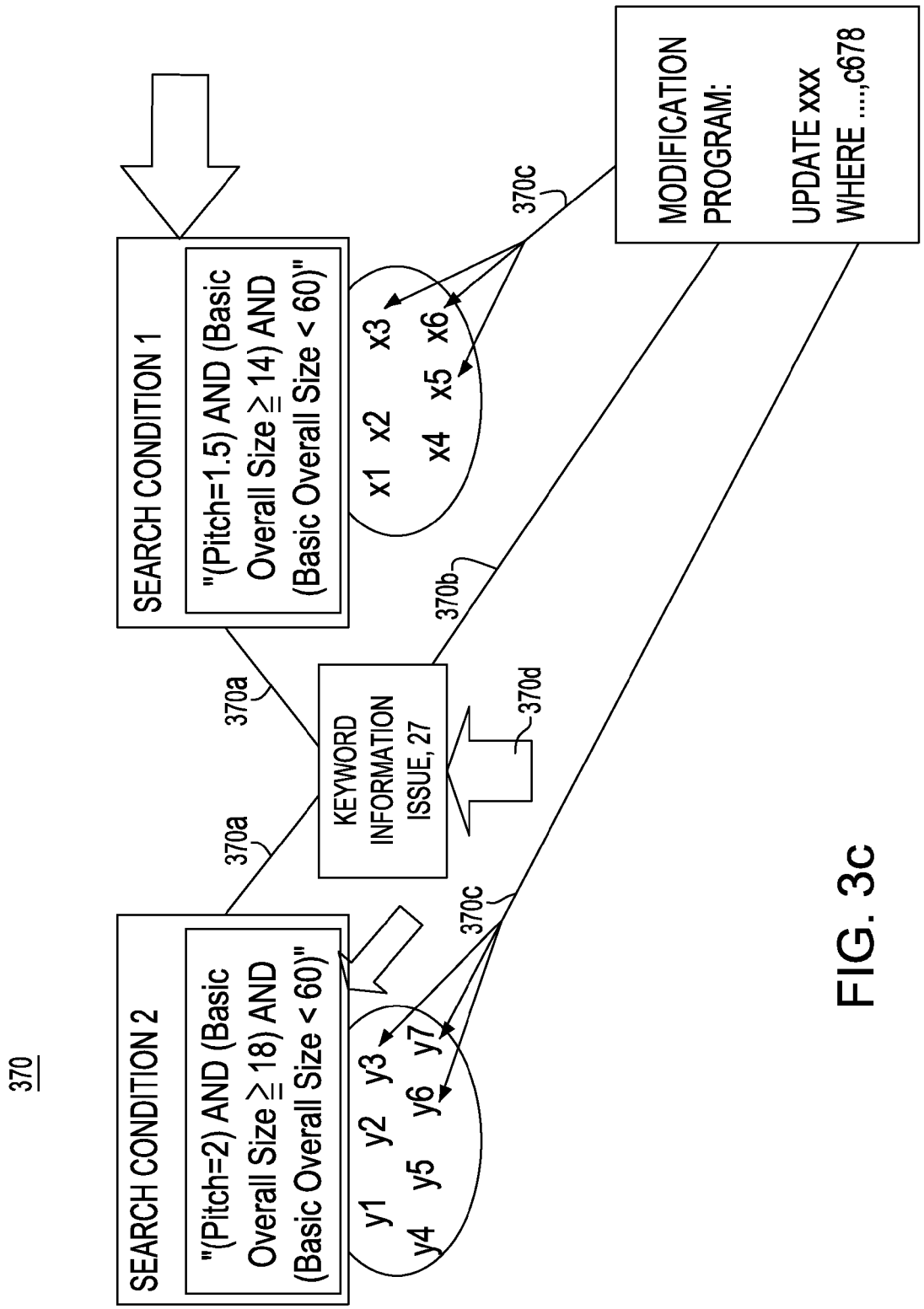
FIG. 3c is a schematic diagram illustrating yet another embodiment of the present invention.

FIG. 3c is a schematic diagram illustrating a workflow according to another embodiment of the present invention. In FIG. 3c, workflow 370 may operated in conjunction with the system illustrated in FIG. 3a and the workflow illustrated in FIG. 3b. Workflow 370 thus illustrates a computer-implemented process, where each step is automatically performed. In addition, workflow 370 also illustrates a computer-implemented process that may include manual entry by at least one user. In step 370a of workflow 360, keyword information is added to search conditions (e.g., search condition 1 and 2 that produce data points x1-x6 and y1-y7, as illustrated in FIG. 2a and 2b, respectively) by a first user, where the first user is not shown in Workflow 370. In step 370b, keyword information is added to a modification program by, for example, a second user, where the second user is not illustrated in Workflow 370. In FIG. 3c, the modification program executes instructions that in turn modify part of the results set from the search conditions configured in step 370a by the first user. In step 370c, the modification program with the added keyword information from step 370b is executed, either by a user or automatically. Finally, in step 370d, the search conditions in the first user configured in step 370a have altered search results as a consequence of the modification program executed in step 370c and the first user is notified that those search conditions have outdated search results and would need to be executed again (as described below).

Figure 4A:
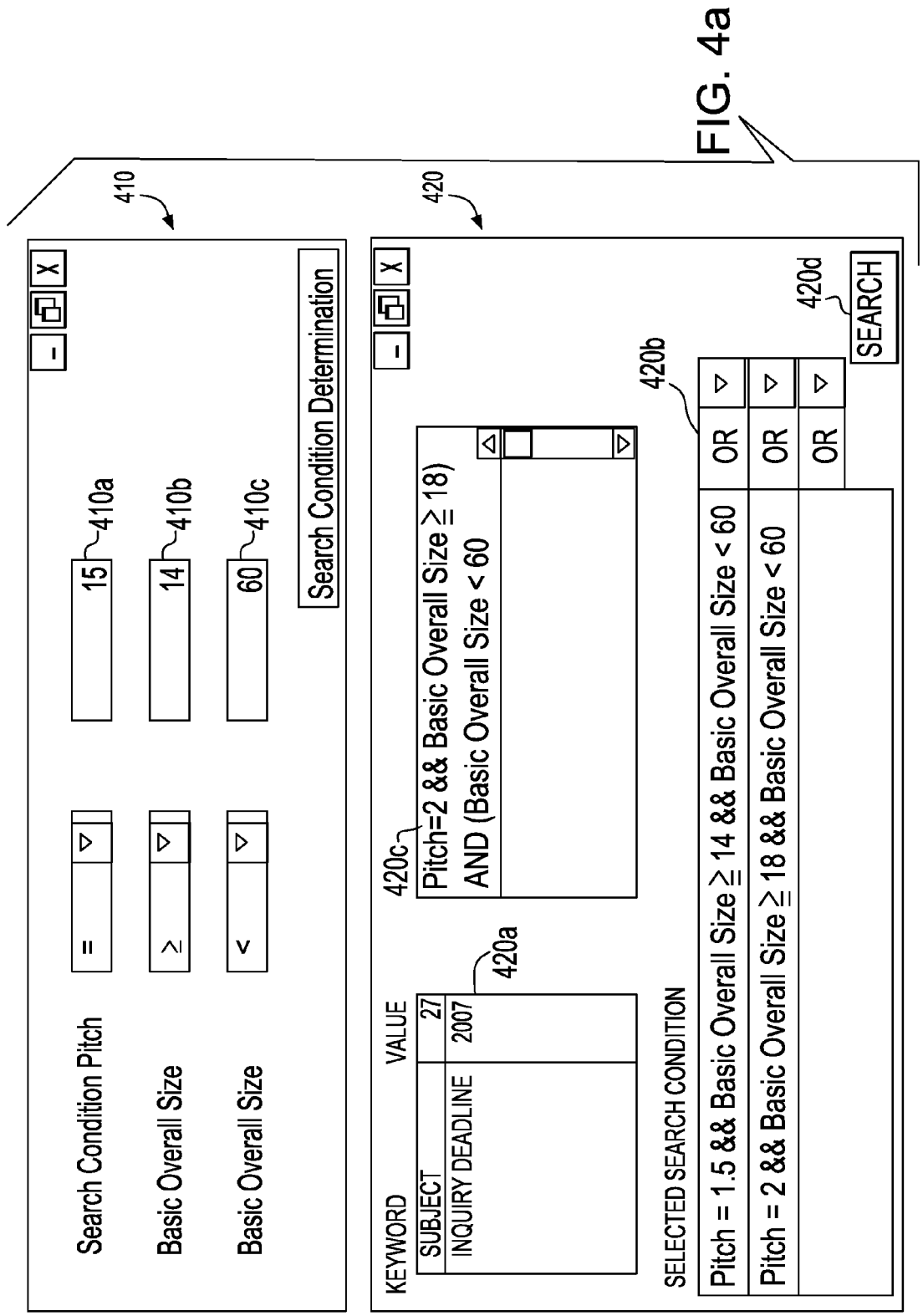
FIG. 4a is a user interface allowing a user to enter search conditions and view modified search conditions, according to one embodiment of the present invention.

In FIG. 4a, two example user interfaces generated for display on client device 310, are shown. Via user interface 410, a user is allowed to enter a search condition via data entry fields 410a-c, shown for the example of a screw device search. As stated previously, in one embodiment of the present invention, the user does not enter a search condition ID for each search condition, rather the search condition ID is automatically assigned once the user enters a search condition.

Additionally, as shown in user interface 420, a keyword/value pair list 420a is populated to enable the user to select a keyword from the list shown, and all the linked search conditions are illustrated in user interface element comprising search condition list 420b. In user interface element comprising a search condition retrieval list 420c, only the search conditions that have updated search results (e.g., because a modification program was executed that modified the search results) are displayed. Consequently, the user may optionally execute any of the search conditions again; for example, by selecting one of the search conditions in the list of 420b and clicking the search button 420d. While not shown in FIG. 4a, another alternative embodiment of the present invention would display the User ID of the users which have search conditions associated with the selected keyword.

In addition, according to alternative embodiments of the present invention, by selecting a search condition from retrieval list 420c, the user is able to recall that search condition, which includes all the keywords that have been associated with the recalled search condition. Optionally, when a user has selected a search condition from retrieval list 420c, the keyword list 420a and search condition list 420b (which may include all the search conditions associated with the keyword list shown in 420a) are automatically filled with the data for the search condition selected from retrieval list 420c.

FIG. 4b illustrates an example user interface that allows a user to register a keyword and add that keyword to a search condition. In user interface element 430a, a user enters a keyword and value. While not shown in 430a, a user may optionally give a description to the keyword (e.g., Table Name, Modification Domain, Item Compared with Search Date, Item Compared with Search Time). In addition, the user may optionally select a search condition in user element 430b (which produces, for example, search results 430c), to associate with the keyword entered in 430a.

Alternatively, as shown in FIG. 4c, a user may select a previously entered keyword/value pair from a list. Thus, in user interface element 440a, a user selects a keyword and value. While not shown in 440a, the keyword will have a description to associate with the keyword (e.g., Table Name, Modification Domain, Item Compared with Search Date, Item Compared with Search Time), where the description may be determined when the keyword was entered or predetermined by a default keyword description configuration. In addition, the user may optionally select a search condition in user element 440b (which produces, for example, search results 440c), to associate with the keyword entered in 440a.

Figure 5A:
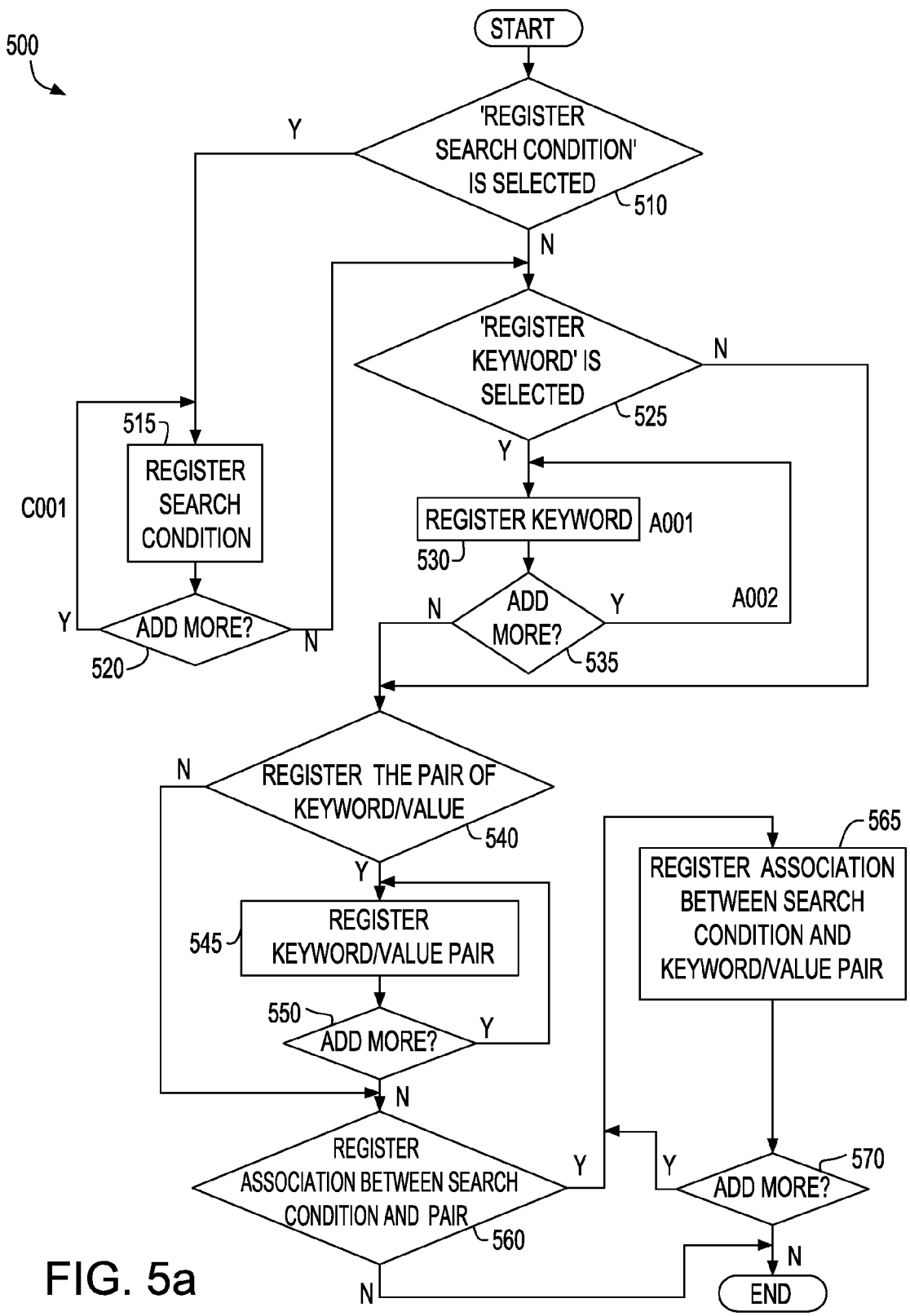
FIG. 5a is a flowchart illustrating a keyword registration process, according to one embodiment of the present invention.

FIG. 5a illustrates a flowchart describing registration process 500, which is a computer-implemented process to register search conditions and keywords, according to one embodiment of the present invention. At step 510, one embodiment of the present invention determines whether the user has chosen to register a search condition. For example, such a determination may include, but is not limited to, the user entering a search condition and selecting a "submit search condition" button on a user interface. Upon determining that the user is registering a search condition, the entered search condition is registered in step 515. While not shown in FIG. 5a, registering a search condition in step 515 may include automatically assigning the search condition a search condition ID and adding the search condition/search condition ID pair into table 340a illustrated in FIG. 3a. In step 520, registration process 500 determines whether the user will register another search condition. For example, such a determination may include, but is not limited to, displaying a user interface element that gives the user the option of entering another search condition. Alternatively, the user may enter several search conditions at one time. Therefore, registration process 500 will cycle through steps 515 and 520 until all the search conditions have been registered. Afterwards, the process proceeds to step 525.

If the user has not selected to register a search condition, registration process 500 next determines whether the user has chosen to register a keyword at step 525. For example, such a determination may include, but is not limited to, the user entering a keyword and selecting a "submit keyword" button on a user interface. Upon determining that the user is registering a keyword, the entered keyword is registered in step 530. While not shown in FIG. 5a, registering a keyword in step 520 may include associating the keyword with a keyword description. The association could be automatic or manual. For example, process 500 could automatically associate a new keyword to a predefined description or the user could manually describe the keyword using a user interface element. An example of a keyword description may include, but is not limited to, the following fields: Table Name, Modification Domain, Item Compared with Search Date, Item Compared with Search Time. Moreover, registering a keyword may also include adding the keyword and its description into table 340b illustrated in FIG. 3a. In step 535, registration process 500 determines whether the user will register another keyword. For example, such a determination may include, but is not limited to, displaying a user interface element that gives the user the option of entering another keyword. Alternatively, the user may enter several keywords and possibly their descriptions at one time. Therefore, registration process 500 will cycle through steps 530 and 535 until all the keywords have been registered.

If the user has not selected to register a keyword at step 525, registration process 500 next determines whether the user has chosen to register a keyword/value pair at step 540. For example, such a determination may include, but is not limited to, the user entering a keyword and keyword value, and selecting a "submit keyword/value pair" button on a user interface. Upon determining that the user is registering a keyword/value pair, the entered keyword and keyword value are registered in step 545. While not shown in FIG. 5a, registering a keyword/value pair in step 545 may include adding the keyword/value pair into table 340b illustrated in FIG. 3a. In step 550, registration process 500 determines whether the user will register another keyword/value pair. For example, such a determination may include, but is not limited to, displaying a user interface element that gives the user the option of entering another keyword/value pair. Alternatively, the user may enter several keywords and their values at one time. Therefore, registration process 500 will cycle through steps 545 and 550 until all the keyword/value pairs have been registered.

If the user has not selected to register a keyword/value pair, registration process 500 next determines whether the user has chosen to link a search condition and keyword/value pair at step 560. For example, such a determination may include, but is not limited to, the user selecting a preregistered search condition and a preregistered keyword/value pair, and selecting a "Link search condition and keyword/value" button on a user interface (not shown). In an alternative embodiment, search conditions and/or keyword/value pairs that have not been registered may be entered. In the alternative embodiment, the entry of an unregistered search condition or keyword/value pair may automatically register the entered search condition and/or keyword/value pair according to a similar process described above. Upon determining that the user is linking a search condition to a keyword/value pair, both the search condition and the keyword/value pair are linked together in step 565. While not shown in FIG. 5a, linking a search condition to a keyword/value pair in step 565 may include adding both the search condition ID and the keyword/value pair into table 340c illustrated in FIG. 3a. In step 570, registration process 500 determines whether the user will perform another association between a search condition and a keyword value pair. For example, such a determination may include, but is not limited to, displaying a user interface element that gives the user the option of entering another search condition and keyword/value pair. Alternatively, the user may enter several search conditions and their respective keyword/value pairs at one time. Therefore, registration process 500 will cycle through steps 565 and 570 until all the search conditions have been linked with their respective keyword/value pairs.

Figure 5B:
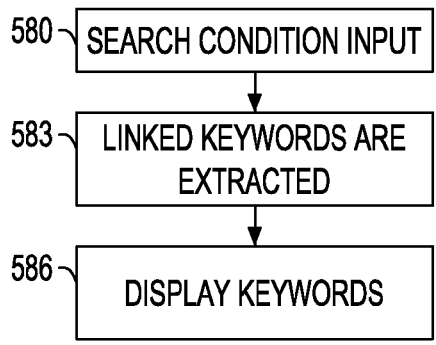
FIG. 5b is a flowchart illustrating keyword extraction process, according to one embodiment of the present invention.
Figure 5C:
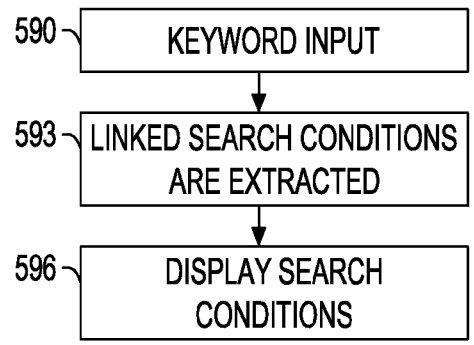
FIG. 5c is a flowchart illustrating search condition extraction process, according to one embodiment of the present invention.

FIGS. 5b and 5c illustrate exemplary processes that may be taken to retrieve keywords associated with a search condition and search conditions associated with a keyword, respectively. In FIG. 5b, at step 580, a search condition is entered, as shown for example, in the UI element 420a of FIG. 4a. Upon receiving the search condition in step 580, step 583 searches and extracts the keywords linked to the search condition (e.g., from table 340c, shown in FIG. 3a). After the keywords have been extracted, they are displayed in step 586. Displaying the list of keywords extracted in step 586 from the search condition entered at step 580 could be similar to the UI element 440a shown in FIG. 4c.

Extracting and displaying associated search conditions from a keyword follows a similar process to what was described above in FIG. 5a. Thus, in FIG. 5b, at step 590, a keyword is entered—as shown, for example, in the UI element 420b of FIG. 4a. Upon receiving the keyword in step 590, step 593 searches and extracts the search conditions linked to the entered keyword (e.g., from table 340c, shown in FIG. 3a). After the search conditions have been extracted, they are displayed in step 596.

Figure 6:
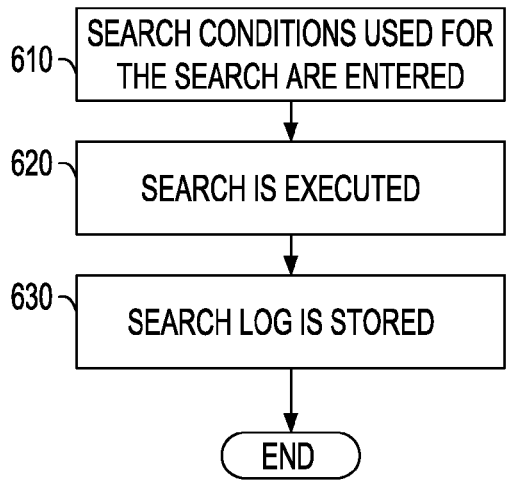
FIG. 6 is a flowchart illustrating a search condition logging process, according to one embodiment of the present invention.

FIG. 6 illustrates a flowchart of the steps taken to store a search condition log, where the search condition log may include, but are not limited to, tables in a database, files on a file system or data structures residing in memory. In addition, the search condition log may be a single logic unit (such as a single log file) or plurality of logical units (such as a plurality of log files). In one embodiment of the present invention, the process shown in FIG. 6 is performed after the registration of one or more search conditions has been performed (e.g., as shown in FIG. 1a). The search condition log(s) store various parameters associated with an executed search condition (e.g., Search Condition ID, Search Date, and Search Time) each time the search is executed. In step 610, the search conditions are entered. The search condition may be entered in a variety of different ways, example input methods include: manually (as shown, for example, in User Interface 410 in FIG. 4a), or selected from a list of pre-entered search conditions. Upon entry, the search is subsequently executed in step 620. Finally, after the search has been executed, the parameters of the search (e.g., Search Condition ID, Search Date, and Search Time) are stored in a search log at step 630.

Figure 7:
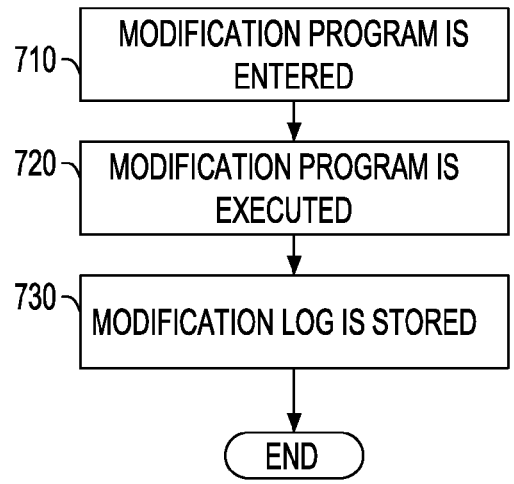
FIG. 7 is a flowchart illustrating a data modification logging process, according to one embodiment of the present invention.

In addition to the search log, one embodiment of the present maintains a modification log to record various parameters associated with a modification program (e.g., Modification ID, Modification date, and Modification Time) each time data is modified according to a modification program that has been linked to, or otherwise associated with, a modification ID. Linking a modification program to a modification ID occurs, in one embodiment of the present invention, via a registration process similar as was described in FIG. 5a for search conditions and keywords. Recording to the modification log is illustrated in FIG. 7. In step 710, the modification program is entered. The modification program may be entered in a variety of different ways, example input methods include: manually (using, for example, SQL commands), or selected from a list of pre-entered modification programs. Upon entry, the modification program is subsequently executed in step 720. Finally, after the search has been executed, the parameters of the search (e.g., Modification ID, Modification date, and Modification Time) are stored in a modification log at step 730.

Figure 8:
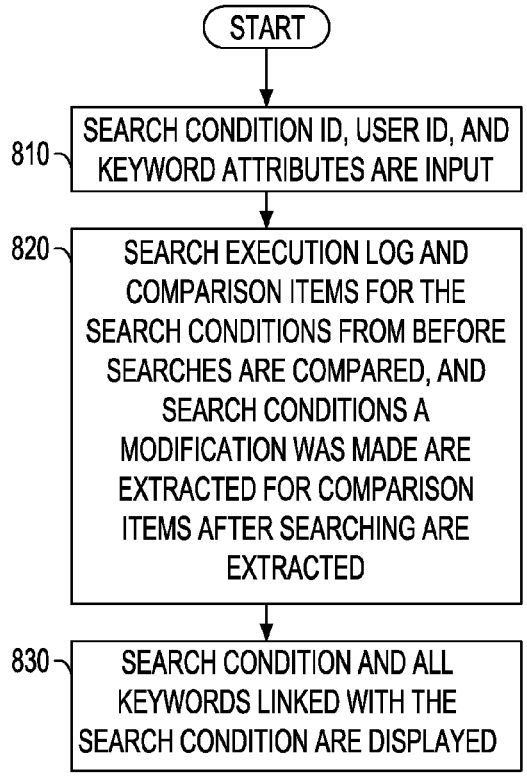
FIG. 8 is a flowchart illustrating extracting a data modification status, from contextual relationships, according to one embodiment of the present invention

After the registration process, shown in FIG. 5a, and commencement of the search condition and modification program logging, shown in FIGS. 6 and 7, one embodiment of the present invention (e.g., illustrated in FIG. 1) executes the process illustrated in FIG. 8 when, for example, directed by the user, at regular set execution times, when a modification program is executed, or when the modification program is changed. At step 810, the search condition ID, User ID and keywords are entered through the various interfaces described herein. In step 820, the search logs and the modification logs are searched to identify contextual relationships (e.g., where a search conditions and a modification program are linked to the same keyword in the same modification domain) between search results and modified data according to the contextual relationship parameters (e.g., the keyword description, as discussed above) defined for the keywords associated with the search conditions. Identifying contextual relationships based on defined contextual relationship parameters is described in further detail below. Finally, the extracted contextual relationships of search results and modified data, along with associated keywords, are displayed to the user in step 830.

Figure 9:
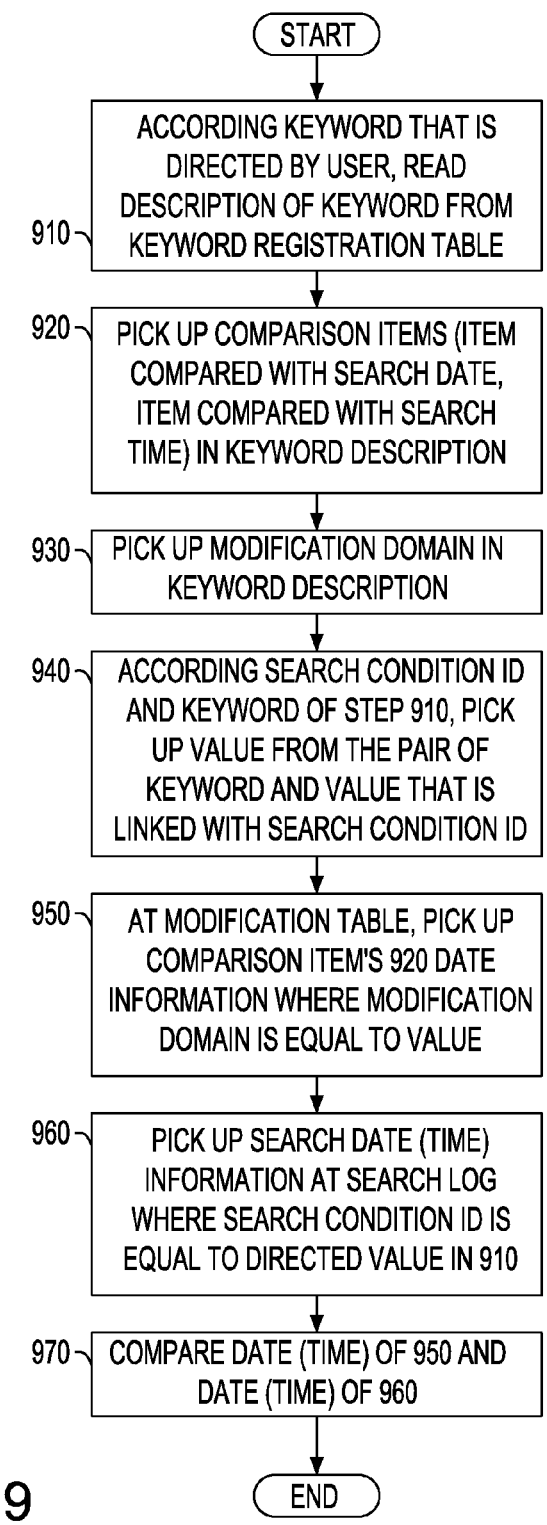
FIG. 9 is a flowchart illustrating a contextual relationship search process, according to one embodiment of the present invention

FIG. 9 illustrates a flowchart showing the process of extracting contextual relationships (e.g., where a search condition and a modification program are linked to the same keyword in the same modification domain) between the search results and modified data based on the contents of the search and modification logs. In step 910, the description of the keyword described by the user (e.g., in step 810 of FIG. 8) is read from the keyword registration table (e.g., table 340b in FIG. 3a). From the keyword description, the comparison items (e.g., common data columns in the search and modification logs) are identified in step 920. Next, the modification domain is identified from the keyword description in step 930. In step 940, the value assigned to the keyword is extracted, according to the search condition ID that was identified by the user in step 810 of FIG. 8. In step 950, the modification log is searched for the modification domain defined by the keyword definition and the modification table according to the keyword value, and the last modification date is extracted from the modification log that corresponds to the modification domain and modification table. In step 960, the last search date is extracted for the search condition ID defined by the user in step 910. The modification date and the search date are compared in step 970. The process of FIG. 9 ends after the step 970 and the comparison results (of the search condition and modification logs) are subsequently displayed in step 830. For example, the displayed output could comprise a list of only those search conditions with search results that have been modified since the last time the search results were viewed. As stated above in FIG. 1, only the executed search conditions which predate the executed modification programs are displayed to allow the user to re-execute the search conditions and view the updated search results.

Figure 10:
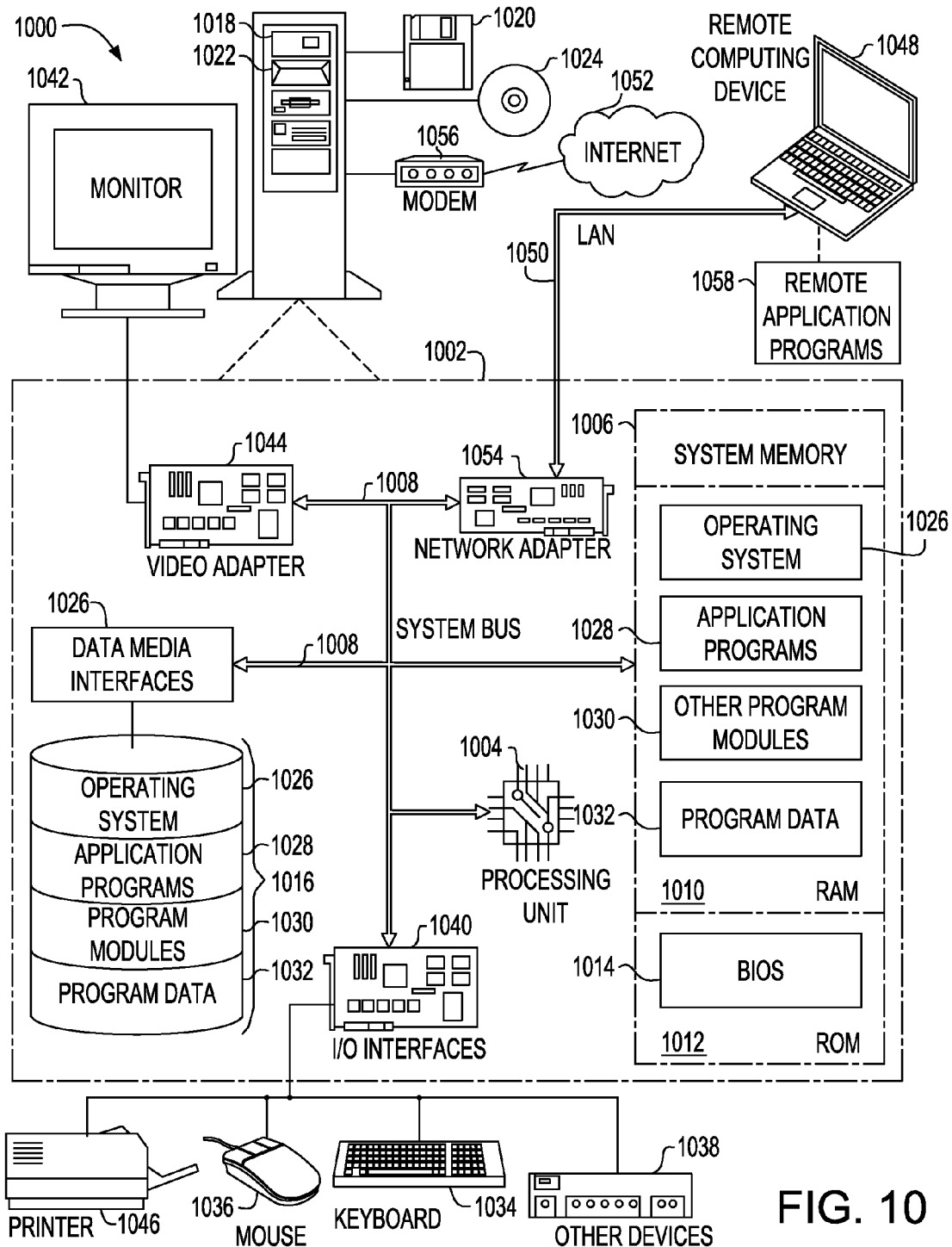
FIG. 10 is a schematic diagram illustrating a computing device, according to one embodiment of the present invention.

FIG. 10 illustrates a general computer environment 1000 that can be used to implement embodiments of the present invention, as described herein. The computer environment 1000 is only one example of a computing environment and is not intended to suggest any limitation as to the scope of use or functionality of the computer and network architectures. Neither should the computer environment 1000 be interpreted as having any dependency or requirement relating to any one or combination of components illustrated in the exemplary computer environment 1000.

Computer environment 1000 includes a general-purpose computing device in the form of a computer 1002. The components of computer 1002 can include, but are not limited to, one or more processors or processing units 1004, a system memory 1006, and a system bus 1008 that couples various system components including the processor 1004 to the system memory 1006.

The system bus 1008 represents one or more of any of several types of bus structures, including a memory bus or memory controller, a peripheral bus, an accelerated graphics port, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

Computer 1002 typically includes a variety of computer readable media. Such media can be any available media that is accessible by computer 1002 and includes both volatile and non-volatile media, removable and non-removable media.

The system memory 1006 includes computer readable media in the form of volatile memory, such as random access memory (RAM) 1010, and/or non-volatile memory, such as read only memory (ROM) 1012. A basic input/output system (BIOS) 1014, containing the basic routines that help to transfer information between elements within computer 1002, such as during start-up, is stored in ROM 1012. RAM 1010 typically contains data and/or program modules that are immediately accessible to and/or presently operated on by the processing unit 1004.

Computer 1002 may also include other removable/non-removable, volatile/non-volatile computer storage media. By way of example, FIG. 10 illustrates a hard disk drive 1016 for reading from and writing to a non-removable, non-volatile magnetic media (not shown), a magnetic disk drive 1018 for reading from and writing to a removable, non-volatile magnetic disk 1020 (e.g., a "floppy disk"), and an optical disk drive 1022 for reading from and/or writing to a removable, non-volatile optical disk 1024 such as a CD-ROM, DVD-ROM, or other optical media. The hard disk drive 1016, magnetic disk drive 1018, and optical disk drive 1022 are each connected to the system bus 1008 by one or more data media interfaces 1026. Alternatively, the hard disk drive 1016, magnetic disk drive 1018, and optical disk drive 1022 can be connected to the system bus 1008 by one or more interfaces (not shown).

The disk drives and their associated computer-readable media provide non-volatile storage of computer readable instructions, data structures, program modules, and other data for computer 1002. Although the example illustrates a hard disk 1016, a removable magnetic disk 1020, and a removable optical disk 1024, it is to be appreciated that other types of computer readable media which can store data that is accessible by a computer, such as magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like, can also be utilized to implement the exemplary computing system and environment.

Any number of program modules can be stored on the hard disk 1016, magnetic disk 1020, optical disk 1024, ROM 1012, and/or RAM 1010, including by way of example, an operating system 1026, one or more application programs 1028, other program modules 1030, and program data 1032. Each of such operating system 1026, one or more application programs 1028, other program modules 1030, and program data 1032 (or some combination thereof) may implement all or part of the resident components that support the distributed file system.

A user can enter commands and information into computer 1002 via input devices such as a keyboard 1034 and a pointing device 1036 (e.g., a "mouse"). Other input devices 1038 (not shown specifically) may include a microphone, joystick, game pad, satellite dish, serial port, scanner, and/or the like. These and other input devices are connected to the processing unit 1004 via input/output interfaces 1040 that are coupled to the system bus 1008, but may be connected by other interface and bus structures, such as a parallel port, game port, or a universal serial bus (USB).

A monitor 1042 or other type of display device can also be connected to the system bus 1008 via an interface, such as a video adapter 1044. In addition to the monitor 1042, other output peripheral devices can include components such as speakers (not shown) and a printer 1046 which can be connected to computer 1002 via the input/output interfaces 1040.

Computer 1002 can operate in a networked environment using logical connections to one or more remote computers, such as a remote computing device 1048. By way of example, the remote computing device 1048 can be a personal computer, portable computer, a server, a router, a network computer, a peer device or other common network node, and the like. The remote computing device 1048 is illustrated as a portable computer that can include many or all of the elements and features described herein relative to computer 1002.

Logical connections between computer 1002 and the remote computer 1048 are depicted as a local area network (LAN) 1050 and a general wide area network (WAN) 1052. Both the LAN and WAN form logical connections via wired communication mediums and appropriate communication protocols (such as Ethernet, see e.g., IEEE 802.3-1998 Std) or wireless communication mediums and appropriate communications protocols (such as Wi-Fi, see e.g., IEEE 802.11-2007 Std). Such networking environments are commonplace in homes, offices, enterprise-wide computer networks, intranets, and the Internet.

When implemented in a LAN networking environment, the computer 1002 is connected to a local network 1050 via a network interface or adapter 1054. When implemented in a WAN networking environment, the computer 1002 typically includes a modem 1056 or other means for establishing communications over the wide network 1052. The modem 1056, which can be internal or external to computer 1002, can be connected to the system bus 1008 via the input/output interfaces 1040 or other appropriate mechanisms. It is to be appreciated that the illustrated network connections are exemplary and that other means of establishing communication link(s) between the computers 1002 and 1048 can be employed.

In a networked environment, such as that illustrated with computing environment 1000, program modules depicted relative to the computer 1002, or portions thereof, may be stored in a remote memory storage device. By way of example, remote application programs 1058 reside on a memory device of remote computer 1048. For purposes of illustration, application programs and other executable program components such as the operating system are illustrated herein as discrete blocks, although it is recognized that such programs and components reside at various times in different storage components of the computing device 1002, and are executed by the data processor(s) of the computer.

Various modules and techniques may be described herein in the general context of computer-executable instructions, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

An implementation of these modules and techniques may be stored on or transmitted across some form of computer readable media. Computer readable media can be any available media that can be accessed by a computer. By way of example, and not limitation, computer readable media may comprise "computer storage media" and "communications media."

"Computer storage media" includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, DVD or other optical storage, magnetic cassettes, magnetic tape, magnetic disk storage or other magnetic storage devices, or any other medium which can be used to store the desired information and which can be accessed by a computer.

"Communication media" typically embodies computer readable instructions, data structures, program modules, or other data in a modulated data signal, such as carrier wave or other transport mechanism. Communication media also includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared, and other wireless media. Combinations of any of the above are also included within the scope of computer readable media.

As will be readily apparent to those skilled in the art, the present invention can be realized in hardware, software, or a combination of hardware and software. Any kind of computer/server system(s) - or other apparatus adapted for carrying out the methods described herein—is suited. A typical combination of hardware and software could be a general-purpose computer system with a computer program that, when loaded and executed, carries out the respective methods described herein. Alternatively, a specific use computer, containing specialized hardware for carrying out one or more of the functional tasks of the invention, could be utilized.

The present invention, or aspects of the invention, can also be embodied in a computer program product, which comprises all the respective features enabling the implementation of the methods described herein, and which—when loaded in a computer system—is able to carry out these methods. Computer program, software program, program, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

While it is apparent that the invention herein disclosed is well calculated to fulfill the objects stated above, it will be appreciated that numerous modifications and embodiments may be devised by those skilled in the art, and it is intended that the appended claims cover all such modifications and embodiments as fall within the true spirit and scope of the present invention.

The invention claimed is:

1. A computer implemented method of managing search conditions used for searching database content to produce a result set, comprising:
   storing a search condition with a first identifier, where the search condition is represented by the first identifier and executing the search condition to generate a result set of the search condition;
   storing a modification program with a second identifier, where the modification program is represented by the second identifier and said modification program modifying the result set of the search condition after the search condition is executed;
   identifying a relationship between the search condition, the modification program and a keyword, the relationship linking the search condition and the modification program to the keyword;
   executing other search conditions which were previously stored and which share the keyword;
   associating the first identifier, which represents the search condition, and the second identifier, which represents the modification program, and the keyword, based on the identified relationship;
   logging execution of the search condition into a first log, where the first log is indexed by a first date in a search log;
   logging execution of the modification program into a second log, where the second log is indexed by a second date in a modification log;
   searching the first log and the second log by comparing the first date and the second date according to the keyword associated with the first and second identifier; and
   extracting outdated search conditions for results that have been modified after the outdated search conditions were executed;
   displaying search results of all the executed search conditions including the extracted outdated search conditions,
   wherein a processor coupled to a memory device performs steps of: the storing the search condition, the storing the modification program, the identifying the relationship, the executing, the associating, the logging the execution of the search condition, the logging the execution of the modification program, the searching, the extracting, and the displaying.

2. The method of claim 1, wherein at least one of the first identifier and the second identifier are automatically generated and associated.

3. The method of claim 1, wherein the first log stores at least the first identifier, a first date and a first time.

4. The method of claim 1, wherein the second log stores at least the second identifier, a second date and a second time.

5. The method of claim 1, wherein at least one of the first identifier and the second identifier is used by different users.

6. The method of claim 1, wherein the keyword is unique to a modification domain.

7. The method of claim 1, wherein the keyword, the first identifier and the second identifier are stored in a modification table.

8. A system of managing search conditions pertaining to accessing database content to produce a result set, comprising:
   a computing system including at least one memory device and at least one processor connected to the at least one memory;
   wherein the computing system is configured to:
   store a search condition with a first identifier, where the search condition is represented by the first identifier and executing the search condition to generate a result set of the search condition;
   store a modification program with a second identifier, where the modification program is represented by the second identifier and said modification program modifying the result set of the search condition after the search condition is executed;
   identify a relationship between the search condition, the modification program and a keyword, the relationship linking the search condition and the modification program to the keyword;
   execute other search conditions which were previously stored and which share the keyword;
   associate the first identifier, which represents the search condition, and the second identifier, which represents the modification program, and the keyword, based on the identified relationship;
   log execution of the search condition into a first log, where the first log is indexed by a first date in a search log;
   log execution of the modification program into a second log, where the second log is indexed by a second date in a modification log;
   search the first log and the second log by comparing the first date and the second date according to the keyword associated with the first and second identifier; and
   extract outdated search conditions for results that have been modified after the outdated search conditions were executed;
   displaying search results of all the executed search conditions including the extracted outdated search conditions.

9. The system of claim 8, wherein at least one of the first identifier and the second identifier are automatically generated and associated.

10. The system of claim 8, wherein the first log stores at least the first identifier, a first date and a first time.

11. The system of claim 8, wherein the second log stores at least the second identifier, a second date and a second time.

12. The system of claim 8, wherein at least one of the first identifier and the second identifier is used by different users.

13. A non-transitory computer-readable medium embodying a listing of instructions executed by a computing device to implement a method of managing search conditions pertaining to accessing database content to produce a result set of said computing device, said method comprising:

storing a search condition with a first identifier, where the search condition is represented by the first identifier and executing the search condition to generate a result set of the search condition;

storing a modification program with a second identifier, where the modification program is represented by the second identifier and said modification program modifying the result set of the search condition after the search condition is executed;

identifying a relationship between the search condition, the modification program and a keyword, the relationship linking the search condition and the modification program to the keyword;

executing other search conditions which were previously stored and which share the keyword;

associating the first identifier, which represents the search condition, and the second identifier, which represents the modification program, and the keyword, based on the identified relationship;

logging execution of the search condition into a first log, where the first log is indexed by a first date in a search log;

logging execution of the modification program into a second log, where the second log is indexed by a second date in a modification log;

searching the first log and the second log by comparing the first date and the second date according to the keyword associated with the first and second identifier; and extracting outdated search conditions for results that have been modified after the outdated search conditions were executed;

displaying search results of all the executed search conditions including the extracted outdated search conditions.

14. The non-transitory computer-readable medium of claim 13, wherein at least one of the first identifier and the second identifier are automatically generated and associated.

15. The non-transitory computer-readable medium of claim 13, wherein the first log stores at least the first identifier, a first date and a first time.

16. The non-transitory computer-readable medium of claim 13, wherein the second log stores at least the second identifier, a second date and a second time.

17. The non-transitory computer-readable medium of claim 13, wherein at least one of the first identifier and the second identifier is used by different users.

18. The non-transitory computer-readable medium of claim 13, wherein the keyword is unique to a modification domain.

19. The non-transitory computer-readable medium of claim 13, wherein the keyword, the first identifier and the second identifier are stored in a modification table.

* * * * *